United States Patent
Kuwano

(10) Patent No.: US 8,428,452 B2
(45) Date of Patent: Apr. 23, 2013

(54) DRIVING MECHANISM, LENS BARREL, AND CAMERA

(75) Inventor: Kunihiro Kuwano, Kawasaki (JP)

(73) Assignee: Nikon Corporation, Tokyo (JP)

( * ) Notice: Subject to any disclaimer, the term of this patent is extended or adjusted under 35 U.S.C. 154(b) by 20 days.

(21) Appl. No.: 13/248,401

(22) Filed: Sep. 29, 2011

(65) Prior Publication Data

US 2012/0082445 A1 Apr. 5, 2012

(30) Foreign Application Priority Data

Sep. 30, 2010 (JP) ................................ 2010-220835

(51) Int. Cl.
*G03B 3/10* (2006.01)
(52) U.S. Cl.
USPC ........................................................ 396/133
(58) Field of Classification Search .................... 396/133
See application file for complete search history.

(56) References Cited

U.S. PATENT DOCUMENTS

| | | | |
|---|---|---|---|
| 2010/0284098 A1* | 11/2010 | Kuwano | 359/824 |
| 2011/0096423 A1* | 4/2011 | Ashizawa | 359/824 |
| 2012/0087024 A1* | 4/2012 | Kuwano | 359/824 |
| 2012/0163787 A1* | 6/2012 | Kuwano et al. | 396/133 |

FOREIGN PATENT DOCUMENTS

JP A-2007-236138 9/2007

* cited by examiner

*Primary Examiner* — Rodney Fuller
(74) *Attorney, Agent, or Firm* — Oliff & Berridge, PLC

(57) ABSTRACT

A driving mechanism includes plural driving members arranged in a circumferential shape around a reference shaft, a base member holding the plural driving members with each interposed in the circumferential direction, first piezoelectric elements vibrating in a thickness-shear vibration mode in a first direction, and second piezoelectric elements vibrating in the thickness-shear vibration mode in a second direction. Each driving member includes a first member and a second member. The base member supports one driving member of two driving members adjacent to each other in the circumferential direction on a first support face and supports the other driving member on a second support face. The base member is formed so that the angle formed by the first support face and the second support face is equal to or greater than 60°.

8 Claims, 5 Drawing Sheets

DRIVING MECHANISM, LENS BARREL, AND CAMERA

CROSS-REFERENCE TO RELATED APPLICATION

Priority is claimed on Japanese Patent Application No. 2010-220835, filed on Sep. 30, 2010, the content of which is incorporated herein by reference.

BACKGROUND

1. Field of the Invention

The present invention relates to a driving mechanism, a lens barrel, and a camera.

2. Description of Related Art

A driving mechanism using a piezoelectric element was known in the past As such a driving mechanism, a driving mechanism was known in which a driving target member is driven by driving plural piezoelectric elements and causing tip members coming in contact with the driving target member, and then move the tip members elliptically. For example, Japanese Patent Application No. 2007-236138 discloses a driving mechanism that drives a driving target member in the X axis direction through the elliptical movement of the tip members parallel to the XZ plane when an XYZ orthogonal coordinate system is defined.

SUMMARY

However, the driving mechanism disclosed in JP-A-2007-236138 has a problem in that the vibration in the lifting direction, in which the distance between a tip member and a base member varies, and the vibration in the feed direction, in which the distance between the tip member and the base member does not vary, cannot be independently controlled. There is also a problem in that when the stiffness of the tip member and the base member is small, the tip member and the base member are deformed due to the vibration in the lifting direction and the vibration in the feed direction of the piezoelectric elements and it is thus not possible to stably drive a member to be driven by the piezoelectric elements.

An object of the aspects of the invention is that it provides a driving mechanism which can independently control vibrations in two different directions of a member to be driven by piezoelectric elements. Another object of the aspects of the invention is to provide a driving mechanism, a lens barrel and a camera that can stably drive the member that is driven by the piezoelectric elements.

The aspects of the invention employ the following configuration corresponding to FIGS. 1 to 7 according to an embodiment of the invention. For purposes to make the explanation of the aspects of the invention easier, the aspects of the invention will be described below with reference to reference signs of the drawings illustrating the embodiment, but the invention is not limited to the embodiment.

According to an aspect of the invention, there is provided a driving mechanism (1) including: a plurality of driving members (3) that are arranged in a circumferential shape around a reference shaft (5); a base member (2) that holds the plurality of driving members (3) with each interposed in the circumferential direction; a first piezoelectric element (6) that vibrates in a thickness-shear vibration mode in a first direction; and a second piezoelectric element (7) that vibrates in the thickness-shear vibration mode in a second direction different from the first direction, wherein each driving member (3) includes a first member (3b) that is driven to vibrate in the first direction by the first piezoelectric element (6) and a second member (3a) that is driven to vibrate in the second direction by the second piezoelectric element (7), the first member (3b) supports the first piezoelectric element (6) on a first face (3/1) parallel to the first direction and supports the second piezoelectric element (7) on a second face (3/2) parallel to the second direction, the base member (2) supports one driving member (3) of two driving members (3) adjacent to each other in the circumferential direction between a first support face (2/1) and the first piezoelectric element (6) which is supported by the first member (3b) of the one driving member (3), and supports the other driving member (3) between a second support face (2/2) and the first piezoelectric element (6) which is supported by the first member (3b) of the other driving member (3), and the base member (2) is formed so that the angle formed by the first support fate (2/1) and the second support face (2/2) is equal to or greater than 60°.

According to the aspects of the invention, a leas barrel (103) includes: the driving mechanism (1); a cam box (106) that is driven by the driving mechanism (1); and a lens (107) that is movably supported by the cam box (106) to adjust a focus.

According to the aspects of the invention, a camera (101) includes; the lens barrel (103); and an imaging device (108) that forms a subject image on an imaging plane through the use of the lens (107) disposed in the lens barrel (103).

The driving mechanism according to the aspects of the invention, it is possible to independently control vibrations in two different directions of a member to be driven by the piezoelectric elements. It is also possible to stably drive the member to be driven by the piezoelectric elements. According to the aspects of the invention, it is possible to provide a lens barrel and a camera including the driving mechanism.

DESCRIPTION OF EMBODIMENTS

Figure 1:
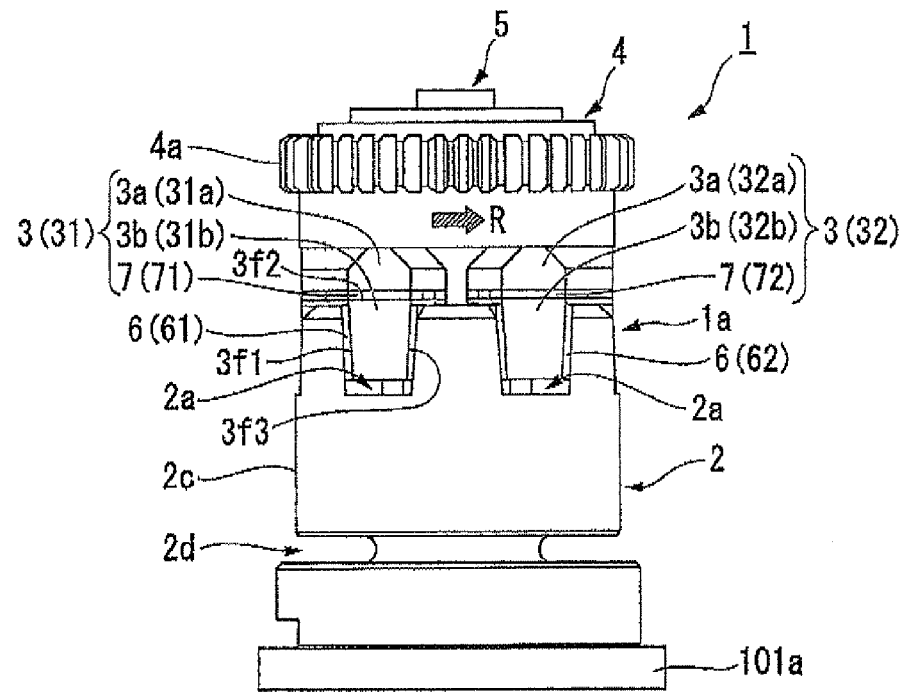
FIG. 1 is a front view of a driving mechanism according to an embodiment of the invention.

Hereinafter, an embodiment of the invention will be described with reference to the accompanying drawings. The embodiment is an example of the invention and does not limit the invention, and can be modified in various forms within the technical concept of the invention. In the drawings, for purposes of ease of understanding, the scales and the numbers are different between an actual structure and the shown structures.

A driving mechanism according to this embodiment performs a relative driving operation of displacing a rotor relative to a base member and drives an optical device or an electronic device such as a lens barrel of a camera through the use of the rotor.

Figure 2:
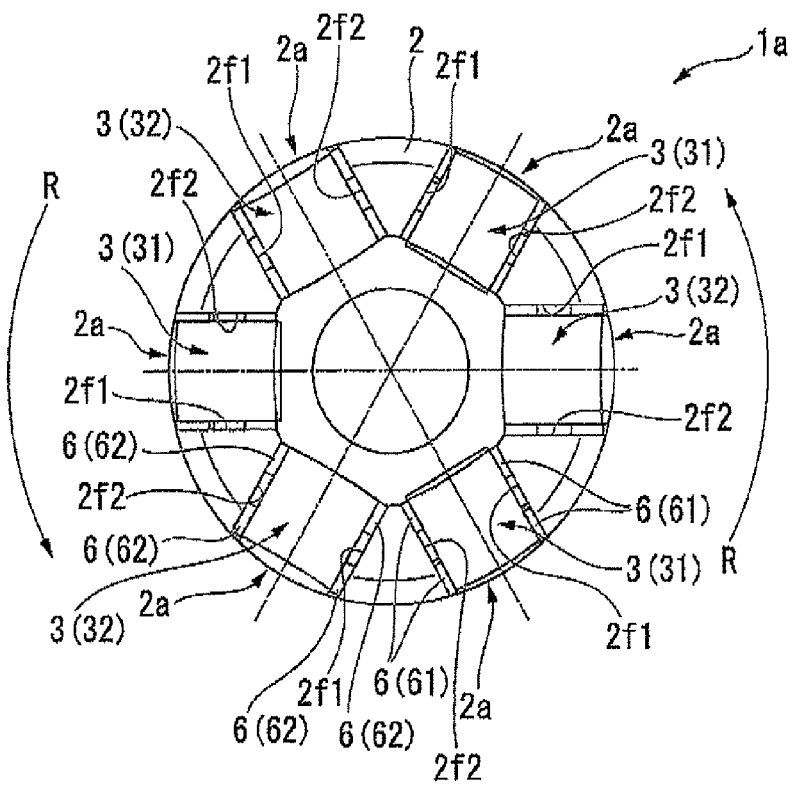
FIG. 2 is a plan view of a supporting and driving section of the driving mechanism shown in FIG. 1.

FIG. 1 is a front view of a driving mechanism according to an embodiment of the invention. FIG. 2 is a plan view of a supporting and driving section of the driving mechanism shown in FIG. 1.

As shown in FIG. 1, a driving mechanism 1 includes a supporting and driving section 1a, a rotor 4, and a support shaft (reference shaft) 5. The supporting and driving section 1a includes plural driving members (driving piece) 3 that are arranged in a circumferential shape around the support shaft 5, a base member 2 that supports the plural driving members 3 with each interposed in the circumferential direction, first piezoelectric elements 6 that vibrate in a thickness-shear vibration mode in a first direction, and second piezoelectric elements 7 that vibrate in the thickness-shear vibration mode in a second direction different from the first direction.

The base member 2 is a conductive elastic body and is formed of a material, for example, including stainless steel. The base member 2 has a hollow cylindrical shape having a through-hole in the shaft direction at the center thereof. The surface of the base member 2 is subjected to insulating treatment, for example, by forming an insulating film (not shown) thereon. The support shaft 5 is inserted into the through-hole of the base member 2.

Plural holding portions 2a are formed at an end (top end) of the base member 2 so as to be adjacent to each other in the circumferential direction of the base member 2. Each holding portion 2a has a concave shape. The holding portion 2a supports the corresponding driving member 3 so as to interpose the driving member 3 between both sides in the circumferential direction of the base member 2, The other end (bottom end) of the base member 2 is fixed to a mounting section 101a by the use of a fastening member such as bolts not shown. A groove portion 2d which is continuous in the circumferential direction is formed in the part closer to the mounting section 101a than the center of the base member 2.

The driving mechanism 1 includes two groups of which each includes three driving members 3 and which are driven with a predetermined phase difference. In this embodiment, out of six driving members 3 arranged at an equal interval in the circumferential direction of the base member 2, three driving members 31 belong to the first group and three driving members 32 belong to the second group. The driving members 31 and the driving members 32 of the groups are alternately arranged in the circumferential direction of the base member 2, that is, in the rotation direction R of the rotor 4.

Each driving member 3 includes a base portion 3b (the first member) and a tip portion 3a (the second member).

The base portion 3b is conductive and is formed of, for example, light metal alloy. The base portion 3b has a substantially rectangular parallelepiped shape in which a pair of side faces intersecting the circumferential direction of the base member 2 is slightly inclined. The base portion 3b is supported by the corresponding holding portion 2a so as to be driven in a direction parallel to the support shaft 5. The base portion 3b is driven by the first piezoelectric elements 6 and vibrates in the first direction.

The base portion 3b supports the first piezoelectric elements 6 on a first face 3f1 (the side surface) parallel to the first direction and supports the second piezoelectric elements 7 on a second face 3f2 (the upper surface) parallel to the second direction. The first face 3f1 and the second face 3f2 intersect each other at an acute angle. The angle formed by the first face 3f1 and the second face 3f2 is set, for example, to be equal to or greater than 84° and equal to or less than 88°, in view of the sizes and tolerance of the members.

Plural (four) first piezoelectric elements 6 are disposed in the base portion 3b. The base portion 3b supports two first piezoelectric elements 6 out of four on the first face 3f1 and supports the other two first piezoelectric elements 6 on a third face 3f3 (the side face) opposed to the first face 3f1. The third face 3f3 and the second face intersect each other at an acute angle. The angle formed by the third face 3f3 and the second face 3f2 is equal to the angle formed by the first face 3f1 and the second face 3f2.

The tip portion 3a is conductive and is formed of, for example, stainless steel. The tip portion 3a has a hexagonal prism shape having a mountain-like cross-section. The tip portion 3a is disposed between the base portion 3b and the rotor 4. The tip portion 3a protrudes from the holding portion 2a to support the rotor 4. The tip portion 3a is driven by the second piezoelectric elements 7 and vibrates in the second direction.

The rotor 4 is mounted on the support shaft 5 with bearings (not shown) interposed therebetween. The rotor 4 is disposed to be rotatable forward and backward in the rotation direction R about the support shaft 5. A gear 4a used to drive, for example, a lens barrel of a camera is formed on the outer circumferential surface of the rotor 4. The surface of the rotor 4 facing the base member 2 is supported by plural driving members 3.

The support shaft 5 is a circular rod-like member of which the center line corresponds to the rotation shaft of the rotor 4. One end (bottom end) of the support shaft 5 is fixed to the mounting section 101a. The support shaft 5 passes through the base member 2 and the rotor 4. The support shaft 5 is disposed at the center of the plural driving members 3 which are arranged in the rotation direction R of the rotor 4.

The first piezoelectric elements 6 are formed of, for example, a material including piezoelectric zirconate titanate (PZT). The first piezoelectric elements 6 are disposed between the inner face of the corresponding holding portion 2a of the base member 2 and the side face of the base portion 3b of the driving member 3. The first piezoelectric elements 6 are disposed to interpose the base portion 3b of the driving member 3 between the front side and the rear side in the rotation direction R of the rotor 4.

Each first piezoelectric element 6 is formed to be long in the shaft direction of the support shaft 5. Plural (two) first piezoelectric elements 6 vibrate in the thickness-shear vibration mode in the first direction along the side faces 3f1 and 3f3 of the base portion 3b. The first piezoelectric elements 6 are disposed to vibrate in the thickness-shear vibration mode in the long direction substantially parallel to the shaft direction of the support shaft 5. The first piezoelectric elements 6 are bonded to both the inner face of the holding portion 2a of the corresponding base member 2 and the side faces 3f1 and 3f3 of the base portion 3b of the corresponding driving member 3 with a conductive adhesive.

The second piezoelectric elements 7 are formed of a material including, for example, piezoelectric zirconate titanate (PZT). Each second piezoelectric element 7 is formed to be long in the direction tangential to the central circle passing through the centers of the driving members 3, that is, in the direction tangential to the turning circle of the rotor 4 at the centers of the driving members 3 (a direction along with the circumferential direction of the base member 2 and parallel to the upper surface 3f2 of the base portion 3b where the second piezoelectric element 7 are arranged, a direction orthogonal to the shaft direction of the support shaft 5 (the second direction)). The second piezoelectric element 7 vibrates in the thickness-shear vibration mode in the second direction along the surface 3f2 of the base portion 3b. The second piezoelectric elements 7 are disposed to vibrate in the thickness-shear vibration mode in the direction tangential to the central circle passing through the centers of the driving members 3. That is the second piezoelectric elements 7 are disposed to vibrate in the thickness-shear vibration mode in the direction tangential to the turning circle of the rotor 4 at the centers of the driving members 3 (a direction along with the circumferential direction of the base member 2 and parallel to the upper surface 312 of the base portion 3b where the second piezoelectric element 7 are arranged, a direction orthogonal to the shaft direction of the support shaft 5 (the second direction)). The second piezoelectric element 7 are bonded to both the bottom surface of the tip portion 3a and the surface 3f2 of the base portion 3b of the corresponding driving member 3 with a conductive adhesive.

As shown in FIG. 2, the base member 2 supports one driving member 3 out of two driving members 3 adjacent to each other in the circumferential direction on the first support face 2f1 with the first piezoelectric elements 6, which is supported by the base portion 3b of one driving member 3, interposed and supports the other driving member 3 on the second support face 2f2 with the that piezoelectric elements 6, which is supported by the base portion 3b of the other driving member 3, interposed.

Figure 3A:
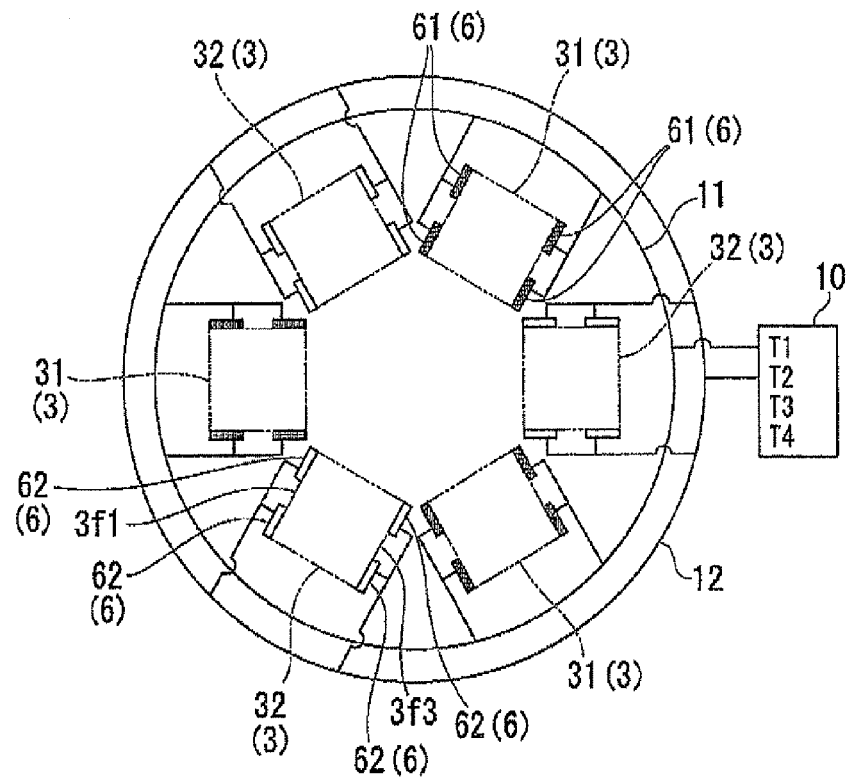
FIG. 3A is a circuit diagram of the driving mechanism shown in FIG. 1.
Figure 3B:
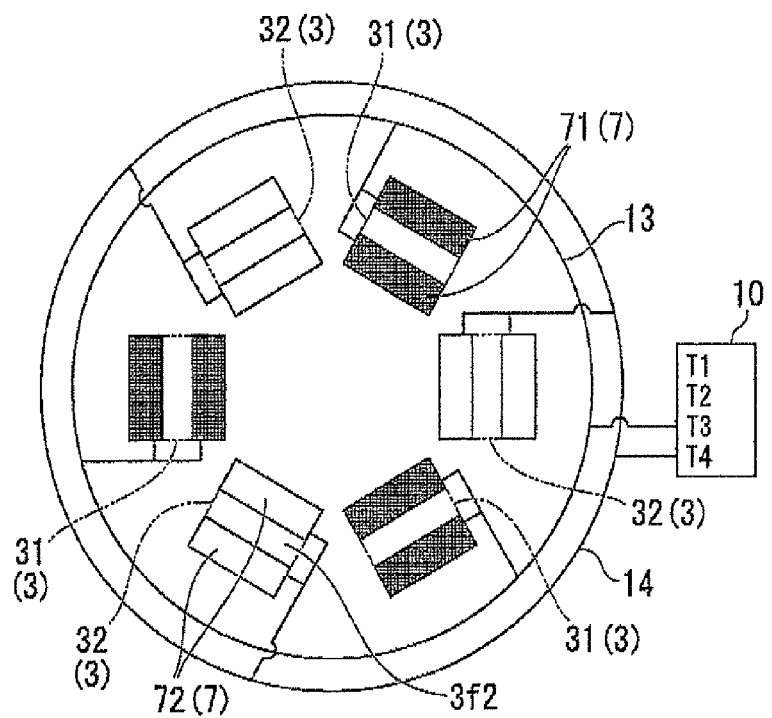
FIG. 3B is a circuit diagram of the driving mechanism shown in FIG 1.

FIGS. 3A and 3B are circuit diagrams of the driving mechanism shown in FIG. 1. FIG. 3A is a diagram illustrating the connection state between the first piezoelectric elements and a power supply unit and FIG. 3B is a diagram illustrating the connection state between the second piezoelectric elements and the power supply unit. For purposes of ease of drawing, the second piezoelectric elements are not shown in FIG. 3A and the first piezoelectric elements are not shown in FIG. 3B.

As shown in FIGS. 3A and 3B, the driving mechanism 1 includes a power supply unit 10 supplying voltages to the first piezoelectric elements 6 and the second piezoelectric elements 7. The power supply unit 10 includes a first terminal T1, a second terminal T2, a third terminal T3, and a fourth terminal T4. The first to fourth terminals T1 to T4 supply sinusoidal voltages of a predetermined frequency to the piezoelectric elements. The power supply unit 10 supplies voltages having a predetermined phase difference and having the same sinusoidal waveform between the first terminal T1 and the second terminal T2 and between the third terminal T3 and the fourth terminal T4.

As shown in FIGS. 1 and 3A, twelve first piezoelectric elements 61 disposed between three driving members 31 belonging to the first group and the base member 2 out of the plural first piezoelectric elements 6 are electrically connected to the first terminal T1 via a line 11. Twelve first piezoelectric elements 62 disposed between three driving members 32 belonging to the second group and the base member 2 out of the plural first piezoelectric elements 6 are electrically connected to the second terminal T2 via a line 12.

As shown in FIGS. 1 and 3B, six second piezoelectric elements 71 disposed between the tip portions 31a and the base portions 31b of three driving members 31 belonging to the first group out of the plural second piezoelectric elements 7 are electrically connected to the third terminal al T3 via a line 13. Six second piezoelectric elements 72 disposed between the tip portions 32a and the base portions 32b of three driving members 32 belonging to the second group out of the plural second piezoelectric elements 7 are electrically connected to the fourth terminal T4 via a line 14.

In the driving mechanism 1, when the rotor 4 is made to rotate through the use of the driving members 3, three driving members 31 of the first group are driven synchronously. Three driving members 32 of the second group are driven synchronously with a predetermined phase difference from the driving members 31 of the first group, similarly to three driving members 31 of the first group. Accordingly, three driving members 31 of the first group and three driving members 32 of the second group alternately support the rotor 4 and cause the rotor 4 to rotate.

Specifically, the first terminal T1 of the power supply unit 10 supplies a sinusoidal voltage to the first piezoelectric elements 61. Then, the first piezoelectric elements 61 start their thickness-shear vibration in the first direction along the support shaft 5. The driving members 31 are driven by the deformation of the first piezoelectric elements 61 and move in the direction in which they are separated from the base member 2.

At this time, the third terminal T3 of the power supply unit 10 supplies a sinusoidal voltage to the second piezoelectric elements 71. Then, the second piezoelectric elements 71 starts their thickness-shear vibration to the front side in the rotation direction R of the rotor 4 in the direction tangential to the central circle passing through the centers of the driving members 3, that is, in the direction tangential to the turning circle of the rotor 4 at the centers of the driving members 3 (a direction along with the circumferential direction of the base member 2 and parallel to the upper surface 3f2 of the base portion 3b where the second piezoelectric element 7 are arranged, a direction orthogonal to the shaft direction of the support shaft 5 (the second direction)). The tip portions 31a of the driving members 31 are driven in the second direction, by the deformation of the second piezoelectric elements 71. At this time, the tip portions 31a of the driving members 31 cause the rotor 4 to rotate forward in the rotation direction R thereof through the use of the frictional force acting between the rotor 4 and the tip portions 31a.

Thereafter, the first piezoelectric elements 61 start the reverse deformation in the direction in which they are separated from the rotor 4 by the sinusoidal voltage supplied from the first terminal T1 of the power supply unit 10. The driving members 31 of the first group move in the direction in which they are separated from the rotor 4 through the use of the reverse deformation of the first piezoelectric elements 61.

At this time, the second piezoelectric elements 71 start the reverse deformation to the rear side in the rotation direction R of the rotor 4 by the sinusoidal voltage supplied from the third terminal T3 of the power supply unit 10. The tip portions 31a of the driving members 31 of the first group move to the rear side in the rotation direction R of the rotor 4 by the reverse deformation of the second piezoelectric elements 71 in the state where they are separated from the rotor 4.

Thereafter, the driving members 31 of the first group repeat the contact of the tip portions 31 a with the rotor 4, the movement of the tip portions 31a to the front side in the rotation direction R of the rotor 4, the separation of the tip portions 31a, from the rotor 4, and the movement of the tip portions 31a to the rear side in the rotation direction R of the rotor 4. That is, the base portions 31b and the tip portions 31a of the driving members 31 are driven by the first piezoelectric elements 61 and vibrate in the first direction substantially parallel to the shaft direction of the support shaft 5. The tip portions 31a of the driving members 31 arc driven by the second piezoelectric elements 71 and vibrate relative to the base portions 31b and the base member 2 in the direction tangential to the turning circle of the rotor 4 at the centers of the driving members 3 (a direction along with the circumferential direction of the base member 2 and parallel to the upper surface 3f2 of the base portion 3b where the second piezoelectric element 7 are arranged, a direction orthogonal to the shaft direction of the support shaft 5 (the second direction)). Accordingly, the driving members 31 of the first group are driven so that the tip portions 31a draw a circular locus or an elliptical locus.

The driving members 32 of the second group are driven with a predetermined phase difference from the driving members 31 of the first group, similarly to the driving members 31 of the first group. That is, the second terminal T2 of the power supply unit 10 supplies a sinusoidal voltage having the same waveform as the voltage supplied from the first terminal T1 and having a predetermined phase difference from the voltage supplied from the first terminal T1 to the first piezoelectric elements 62. The fourth terminal T4 of the power supply unit 10 supplies a sinusoidal voltage having the same waveform as the voltage supplied from the third terminal T3 and having a predetermined phase difference from the voltage supplied from the third terminal T3 to the second piezoelectric elements 72.

The tip portions 32a of three driving members 32 of the second group come in S contact with the rotor before the tip portions 31a of three driving members 31 of the first group is separated from the rotor 4, and are separated from the rotor 4 after the tip portions 31a of three driving members 31 of the first group come in contact with the rotor 4. Accordingly, the rotor 4 is alternately supported and driven by three driving members 31 of the first group and three driving members 32 of the second group, and rotate forward or backward in the rotation direction It at a predetermined rotation speed in the state where its position in the shaft direction of the support shaft 5 is kept substantially constant.

In this way, the driving mechanism 1 includes the first piezoelectric elements 6 vibrating in the thickness-shear vibration mode in the first direction parallel to the support shaft 5 and the second piezoelectric elements 7 vibrating in the thickness-shear vibration mode in the second direction which is a direction orthogonal to the shaft direction of the support shaft 5 and a direction tangential to the turning circle of the rotor 4 at the centers of the driving members 3.

Accordingly, the base portion 3b and the tip portion 3a of each driving member 3 can be made to vibrate in the direction (the first direction) substantially parallel to the support shaft 5 relative to the base member 2 by the use of the first piezoelectric elements 6. The tip portion 3a of each driving member 3 can be made to vibrate in the direction (the second direction) which is a direction orthogonal to the shaft direction of the support shaft 5 and a direction tangential to the turning circle of the rotor 4 at the centers of the driving members 3, relative to the base member 2 and the base portion 3b of the driving member 3 by the use of the second piezoelectric elements 7.

Therefore, in the driving mechanism 1 according to this embodiment, it is possible to independently control the vibration of the tip portions 3a of the driving members 3 in the direction (the first direction) parallel to the support shaft 5 and the vibration of the tip portions 3a in the direction (the second direction) which is a direction orthogonal to the shaft direction of the support shaft 5 and tangential to the turning circle of the rotor 4 at the centers of the driving members 3 by independently controlling the first piezoelectric elements 6 and the second piezoelectric elements 7. Accordingly, compared with the configuration disclosed in Japanese Patent Application. No. 2007-236138, it is possible to cause the driving members 3 to efficiently vibrate in the directions and to cause the rotor 4 to efficiently rotate.

Figure 4:
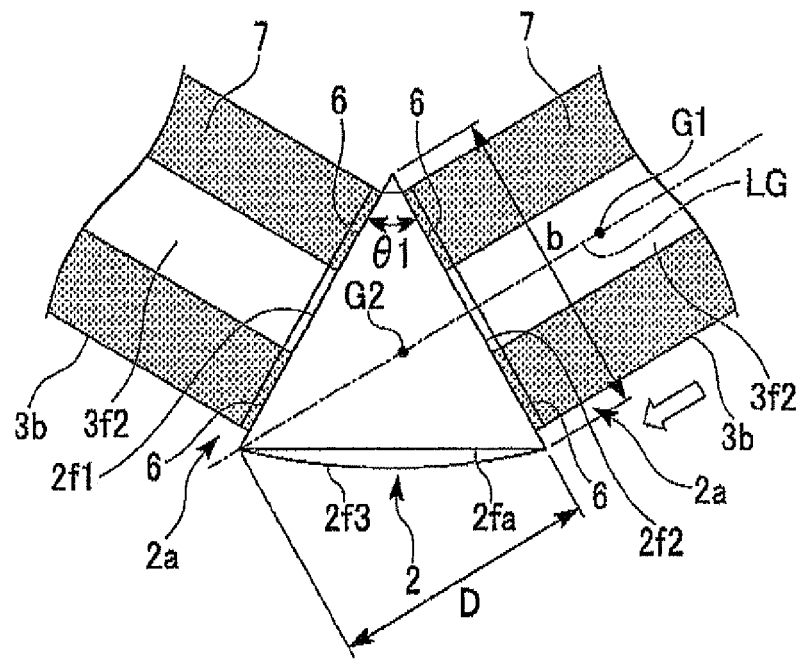
FIG. 4 is a plan view of a base member of the driving mechanism shown in FIG. 1.

FIG. 4 is a plan view of the base member of the driving mechanism shown in FIG. 1. In FIG. 4, reference sign θ1 represents the angle formed by the first support face 2f1 and the second support face 2f2, reference sign θ2 represents the angle formed by the first support face 2f1 and a virtual face 2fa, and reference sign θ3 represents the angle formed by the second support face 2f2 and the virtual face 2fa. Reference sign G1 represents the centroid (center) of the base portion 3b and reference sign G2 represents the centroid (center) of the base member 2 (specifically, a part between the two neighboring holding portions 2a of the base member 2, which may be simply referred to as the base member). Reference sign LG represents a line passing through the center G1 of the base portion 3b and being parallel to the second direction. Reference sign 2f3 represents a non-support face not supporting the base portion 3b out of the side faces of the base member 2. Reference sign b represents the length of the bottom side (the part of the base member 2 to which a load is applied from the second support face 2f2) of a regular triangle circumscribing the first support face 2f1 and the second support face 2f2, and having a point at which the first support face 2f1 and the non-support face 2f3 intersects each other and a point at which the second support face 212 and the non-support face 2f3 intersects each other as two vertices. Reference sign D represents the height (the length from the bottom side to the vertex) of the regular triangle.

It is assumed that the base portion 3b and the base member 2 are formed of a homogeneous material and the centroid (the center core of the figure) and the center (a point of action of the combined universal gravitation acting on a mass from another object in a system in which mass is spatially distributed) correspond to each other.

As shown in FIG. 4, the base member 2 is formed so that the angle θ1 formed by the first support face 2f1 and the second support face 212 is equal to or greater than 60°. Accordingly, compared with the configuration in which the angle formed by the first support face and the second support face of the base member is smaller than 60°, it is possible to stably take out the vibration (the main vibration) of the second piezoelectric elements 7 in the second direction.

For example, when the angle formed by the first support face and the second support face of the base member is smaller than 60°, the base member is narrowed and the stiffness of the base member against the vibration (the main vibration) of the second piezoelectric elements in the second direction is reduced (the base member is easily deformed due to the vibration of the second piezoelectric element in the second direction), whereby it is difficult to stably take out the vibration of the second piezoelectric element 7 in the second direction. However, in this embodiment, since the angle θ1 formed by the first support face 2f1 and the second support face 2f2 is equal to or greater than 60°, the stiffness of the base portion 3b against the vibration of the second piezoelectric elements 7 in the second direction is great. Accordingly, it is possible to stably take out the vibration of the second piezoelectric elements 7 in the second direction. Therefore, it is possible to provide a driving mechanism 1 which can independently control the vibrations in two different directions of the member to be driven by the piezoelectric elements 6 and 7 and which can stably drive the member to be driven by the piezoelectric elements 6 and 7.

The base member 2 is formed so that the angle θ1 formed by the first support face 2f1 and the second support face 2f2 is 60°. Accordingly, compared with the configuration in which the angle formed by the first support face and the second support Thee of the base member is greater than 60°, it is possible to stably take out the vibration (the main vibration) of the second piezoelectric elements 7 in the second direction.

For example, when the angle formed by the first support face and the second support face of the base member is greater. Then 60°, the number of driving members to be installed is reduced and it is thus difficult to stably drive the rotor. Specifically, in the configuration in which a driving mechanism has two groups of two driving members which are driven with a predetermined phase difference, the rotor is alternately supported and made to rotate by the use of two driving members of the first group and two driving members of the second group, whereby the driving of the rotor is destabilized. However, in this embodiment, since the angle θ1 formed by the first support face 2f1 and the second support face 2f2 is equal to or greater than 60°, the driving mechanism 1 can be configured to include two groups of three driving members 3 which are driven with a predetermined phase difference. Accordingly, it is possible to alternately support and rotate the rotor 4 through the use of three driving members of the first group and three driving members of the second group, thereby stabilizing the driving of the rotor 4. Therefore, it is possible to stably take out the vibration of the second piezoelectric elements 7 in the second direction.

The line LG passing through the center G1 of the base portion 3b and being parallel to the second direction passes through the non-support face 2f3 not supporting the base portion 3b out of the side faces of the base member 2. Accordingly, compared with the configuration in which the line passing through the center of the base portion and being parallel to the second direction does not pass through the non-support face (for example, the configuration in which the line passes through only the first support face and the second support face which supports the base portion out of the side faces of the base member), it is possible to stably take out the vibration (the main vibration) of the second piezoelectric elements 7 in the second direction.

For example, when the line passing through the center of the base portion and being parallel to the second direction does not pass through the non-support face, the base member is narrowed and the stiffness of the base member against the vibration (the main vibration) of the second piezoelectric elements in the second direction is reduced (the base member is easily deformed due to the vibration of the second piezoelectric element in the second direction), whereby it is difficult to stably take out the vibration of the second piezoelectric element in the second direction. However, in this embodiment, since the line LG passes through the non-support face 2f3, the stiffness of the base portion 3b against the vibration of the second piezoelectric elements 7 in the second direction is great. Therefore, it is possible to stably take out the vibration of the second piezoelectric elements in the second direction.

The line LG passes through the center of the regular triangle circumscribing the first support face 2f1 and the second support faze 2f2 and having a point at which the first support face 2f1 and the non-support face 2f3 intersects each other and a point at which the second support face 2f2 and the non-support face 2f3 intersects each other as two vertices. That is, since the line LG passes through the substantial center of the base member 2, it is possible to achieve the decrease in size of the base member 2 and to enhance the stiffness of the base member 2 against the vibration (the main vibration) of the second piezoelectric elements 7 in the second direction.

For example, it can be considered that the vibration (the load) of the second piezoelectric elements 7 in the second direction is applied to the base member 2 from the second support face 2f2 (which is indicated by the arrow in FIG. 4). Here, it is assumed that the length of the part (bottom side) of the base member 2 to which the load is applied is defined as b and the height (the length from the bottom side to the vertex) when the base member 2 is the regular triangle is defined as D. At this time, the second moment of area I of the base member 2 (regular triangle) is expressed by Expression 1.

$$I = b \cdot D^3 / 36 \qquad (1)$$

The second moment of area means the degree of deformation ease such as bending or deflection which is changed depending on the sectional shape and which is numerically expressed, when a load is applied to the base member 2. As described in Expression 1, the magnitude of the second moment of area I of the base member 2 becomes greater as the distance D from the bottom side to the vertex becomes greater. Accordingly, it can be seen the stiffness of the base member 2 against the vibration (the main vibration) of the second piezoelectric elements 7 in the second direction increases as the distance I) from the bottom side to the vertex increases. Here, in view of the decrease in size of the base member 2, the magnitude of the distance D from the bottom side to the vertex is set to be equal to the height when the base member 2 is the regular triangle.

Figure 5:
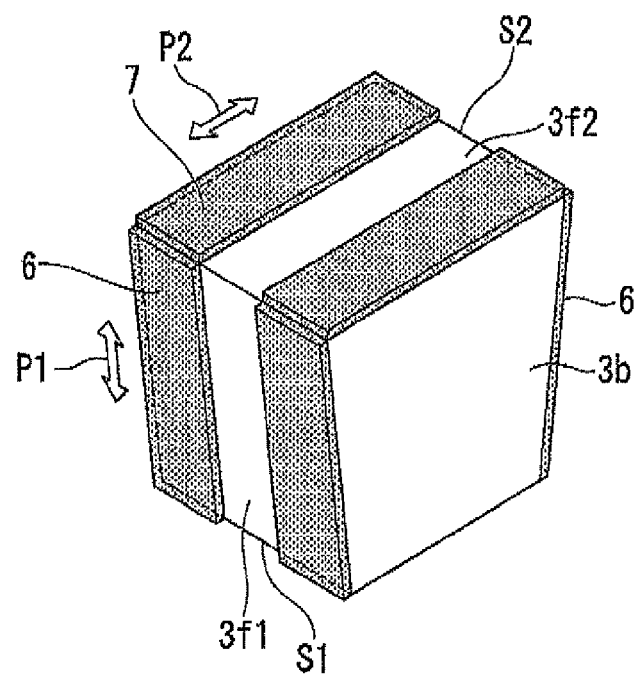
FIG. 5 is a perspective view of a first member of the driving mechanism shown in FIG. 1.

FIG. 5 is a perspective view of a base portion of the driving mechanism shown in FIG. 1. In FIG. 5, reference sign S1 represents the outer shape (outline) of the first face 3f1 and reference sign 52 represents the outer shape (outline) of the second face 3f2. Reference sign P1 represents the direction of the vibration (the direction of the load applied to the base portion 3b due to the vibration in the first direction) of the first piezoelectric elements 6 in the first direction and reference sign P2 represents the direction of the vibration (the direction of the load applied to the base portion 3b due to the vibration in the first direction) of the second piezoelectric elements 7 in the second direction.

As shown in FIG. 5, the base portion 3b is formed so that the outer shape S1 of the first face 3f1 is square and the outer shape S2 of the second face 3f2 is square. Accordingly, the stiffness of the base portion 3b against the vibration (the main vibration) P1 of the first piezoelectric elements 6 in the first direction and the stiffness of the base portion 3b against the vibration (the main vibration) P2 of the second piezoelectric elements 7 in the second direction can be made to be equal to each other. Therefore, it is possible to stably drive the member to be driven by the piezoelectric elements 6 and 7.

In this embodiment, plural (four) first piezoelectric elements 6 are disposed in the base portion 3b, but the invention is not limited to this configuration. For example, one, two, three, or five or more first piezoelectric elements may be disposed in the base portion 3b. That is, the number of first piezoelectric elements can be appropriately changed as needed.

In this embodiment, two second piezoelectric elements 7 are disposed in the base portion 3b, but the invention is not limited to this configuration. For example, one or three or more second piezoelectric elements may be disposed in the base portion 3b. That is, the number of second piezoelectric elements can be appropriately changed as needed.

Figure 6:
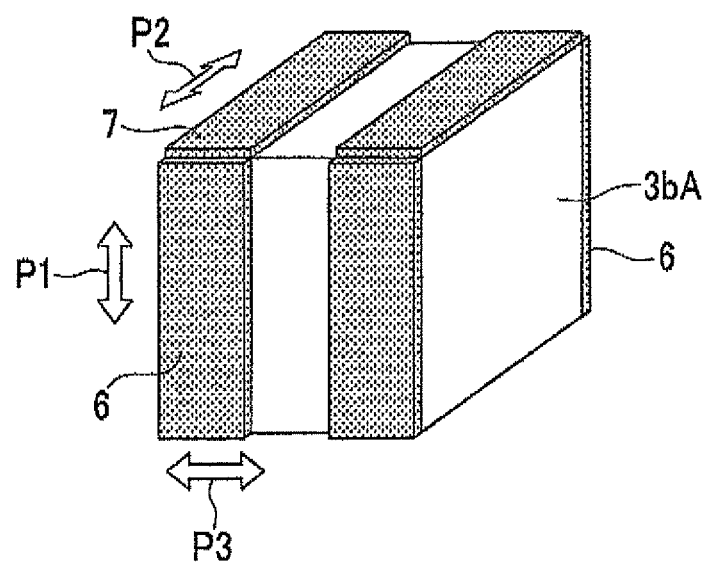
FIG. 6 is a perspective view illustrating a first modification example of the first member of the driving mechanism shown in FIG. 1.

FIG. 6 is a perspective view illustrating a first modification of a base portion of the driving mechanism shown in FIG. 1, In FIG. 6, reference sign P1 represents the direction of the vibration (the direction of the load applied to the base portion 3b due to the vibration in the first direction) of the first piezoelectric elements 6 in the first direction, reference sign P2 represents the direction of the vibration (the direction of the load applied to the base portion 3b due to the vibration in the first direction) of the second piezoelectric elements 7 in the second direction, and reference sign P3 represents the component, in the radius direction (a component in the direction perpendicular to the first direction and the second direction) of the base member 2, the vibration (the load) applied to the base portion 3b in the second direction.

As shown in FIG. 6, a base portion 3b A which is the first modification of the base portion 3b has a cubic shape.

Accordingly, the stiffness of the base portion 3bA against the vibration (the main vibration) P1 of the first piezoelectric elements 6 in the first direction, the stiffness of the base portion 3bA against the vibration (the main vibration) P2 of the second piezoelectric elements 7 in the second direction, and the stiffness of the base portion 3bA against the vibration P3 in the direction perpendicular to the first direction and the second direction can be made to be equal to each other. Therefore, it is possible to stably drive the member to be driven by the piezoelectric elements 6 and 7.

Examples of a lens barrel and a camera including the driving mechanism 1 according to this embodiment will be described below. An interchangeable lens according to this embodiment forms a camera system along with a camera body. The interchangeable lens can be switched between an AF (Auto Focus) mode in which a focusing operation is performed under a known AF control and an MF (Manual Focus) mode in which the focusing operation is performed in response to a manual input from a photographer.

Figure 7:
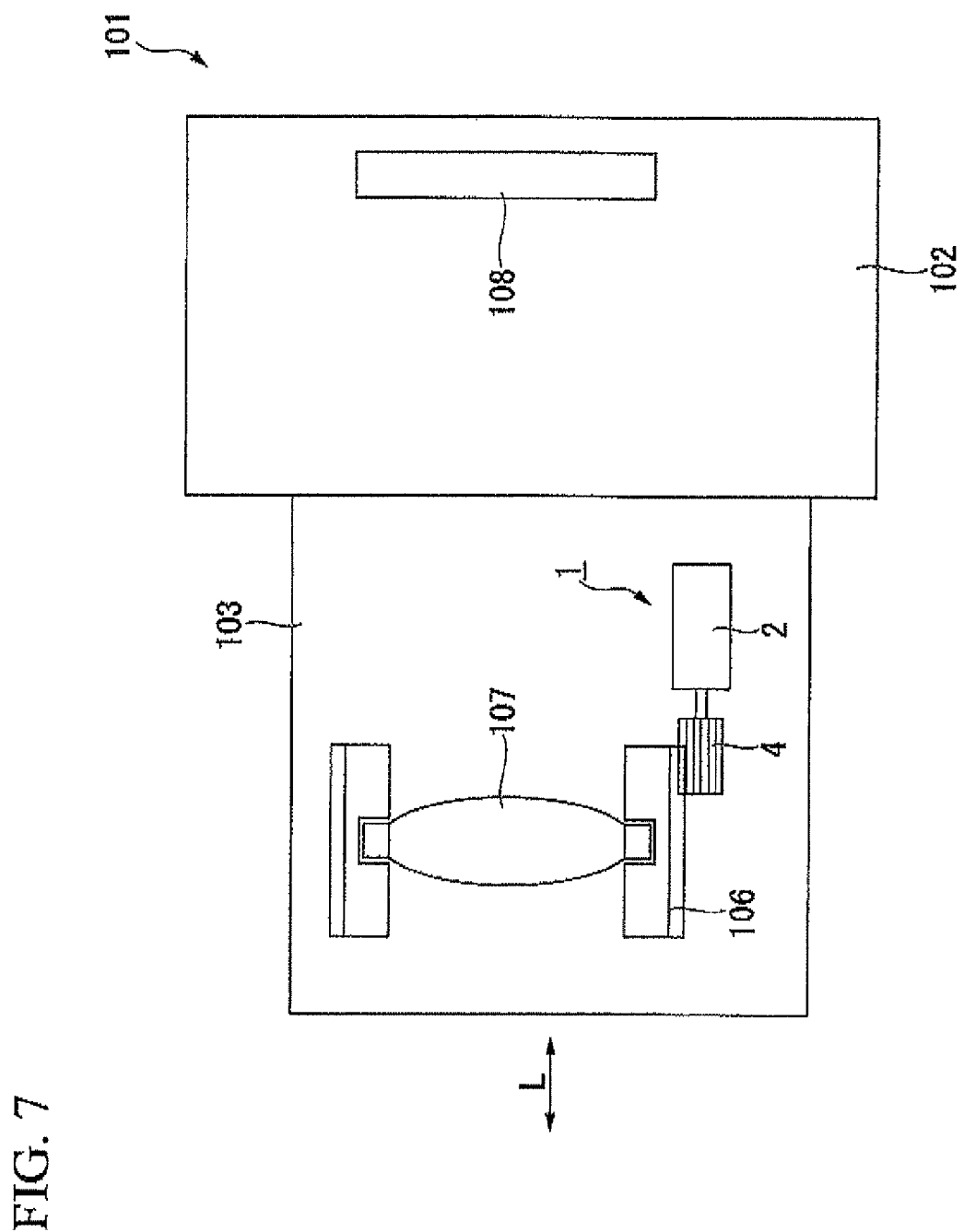
FIG. 7 is a diagram schematically illustrating the configurations of a lens barrel and a camera including the driving mechanism shown in FIG. 1.

FIG. 7 is a diagram schematically illustrating the configurations of a lens barrel and a camera having the driving mechanism shown in FIG, 1. As shown in FIG. 7, a camera 101 includes a camera body 102 having an imaging device 108 built therein and a lens barrel 103 having a lens 107.

The lens barrel 103 is an interchangeable lens that can be attached to and detached from the camera body 102. The lens barrel 103 includes the lens 107, a cam box 106, and a driving mechanism 1. The driving mechanism 1 is used as a drive source driving the lens 107 in the focusing operation of the camera 101.

The driving force acquired from the rotor 4 of the driving mechanism 1 is transmitted directly to the cam box 106. The lens 107 is supported by the cam box 106 and is a focusing lens that moves substantially in parallel to the optical axis direction L to adjust the focus through the use of the driving force of the driving mechanism 1.

At the time of using the camera 101, a subject image is formed on the imaging plane of the imaging device 108 through the use of a lens group (including the lens 107) disposed in the lens barrel 103. The formed subject image is converted into an electrical signal by the imaging device 108 and image data is acquired by MD converting the electric signal.

As described above, the camera 101 and the lens barrel 103 include the above-mentioned driving mechanism 1. Accordingly, it is possible to independently control the vibrations in two different directions of a member to be driven by the piezoelectric elements and to stably drive the member to be driven by the piezoelectric elements.

Although it has been stated in this embodiment that the lens barrel 103 is an interchangeable lens, the invention is not limited to this example and a lens barrel incorporated into the camera body may be used.

What is claimed is:

1. A driving mechanism comprising:
    a plurality of driving members that are arranged in a circumferential shape around a reference shaft;
    a base member that holds the plurality of driving members with each interposed in the circumferential direction;
    a first piezoelectric element that vibrates in a thickness-shear vibration mode in a first direction; and
    a second piezoelectric element that vibrates in the thickness-shear vibration mode in a second direction different from the first direction,
    wherein the driving members each comprises a first member that is driven to vibrate in the first direction by the first piezoelectric element and a second member that is driven to vibrate in the second direction by the second piezoelectric element,
    wherein the first member supports the first piezoelectric element on a first face parallel to the first direction and supports the second piezoelectric element on a second face parallel to the second direction,
    wherein the base member supports one driving member of two driving members adjacent to each other in the circumferential direction between a first support face and the first piezoelectric element which is supported by the first member of the one driving member, and supports the other driving member between a second support face and the first piezoelectric element which is supported by the first member of the other driving member, and
    wherein the base member is formed so that the angle formed by the first support face and the second support face is equal to or greater than 60°.

2. The driving mechanism according to claim 1, wherein the first member is formed so that an outer shape of the first face is a square shape, and
    wherein the second member is formed so that an outer shape of the second face is square.

3. The driving mechanism according to claim 1, wherein the first member has a cubic shape.

4. The driving mechanism according to claim 1, wherein the base member is formed so that an angle formed by the first support face and the second support face is 60°.

5. The driving mechanism according to claim 1, wherein a line passing through the center of gravity of the first member and parallel to the second direction passes through a non-support face not supporting the first member out of side surfaces of the base member.

6. The driving mechanism according to claim 5, wherein the line passes through a centroid of a regular triangle, the regular triangle circumscribing the first support face and the second support face and having a point at which the first support face and the non-support face intersects each other and a point at which the second support face and the non-support face intersects each other as two vertices.

7. A lens barrel comprising:
    the driving mechanism according to claim 1;
    a cam box that is driven by the driving mechanism; and
    a lens that is movably supported by the cam box to adjust a focus.

8. A camera comprising:
    the lens barrel according to claim 7; and
    an imaging device that forms a subject image on an imaging plane through the use of a lens disposed in the lens barrel.

* * * * *